Nov. 13, 1951 — O. M. GOOD — 2,574,556
HYDRAULIC VALVE
Filed March 10, 1947 — 2 SHEETS—SHEET 1
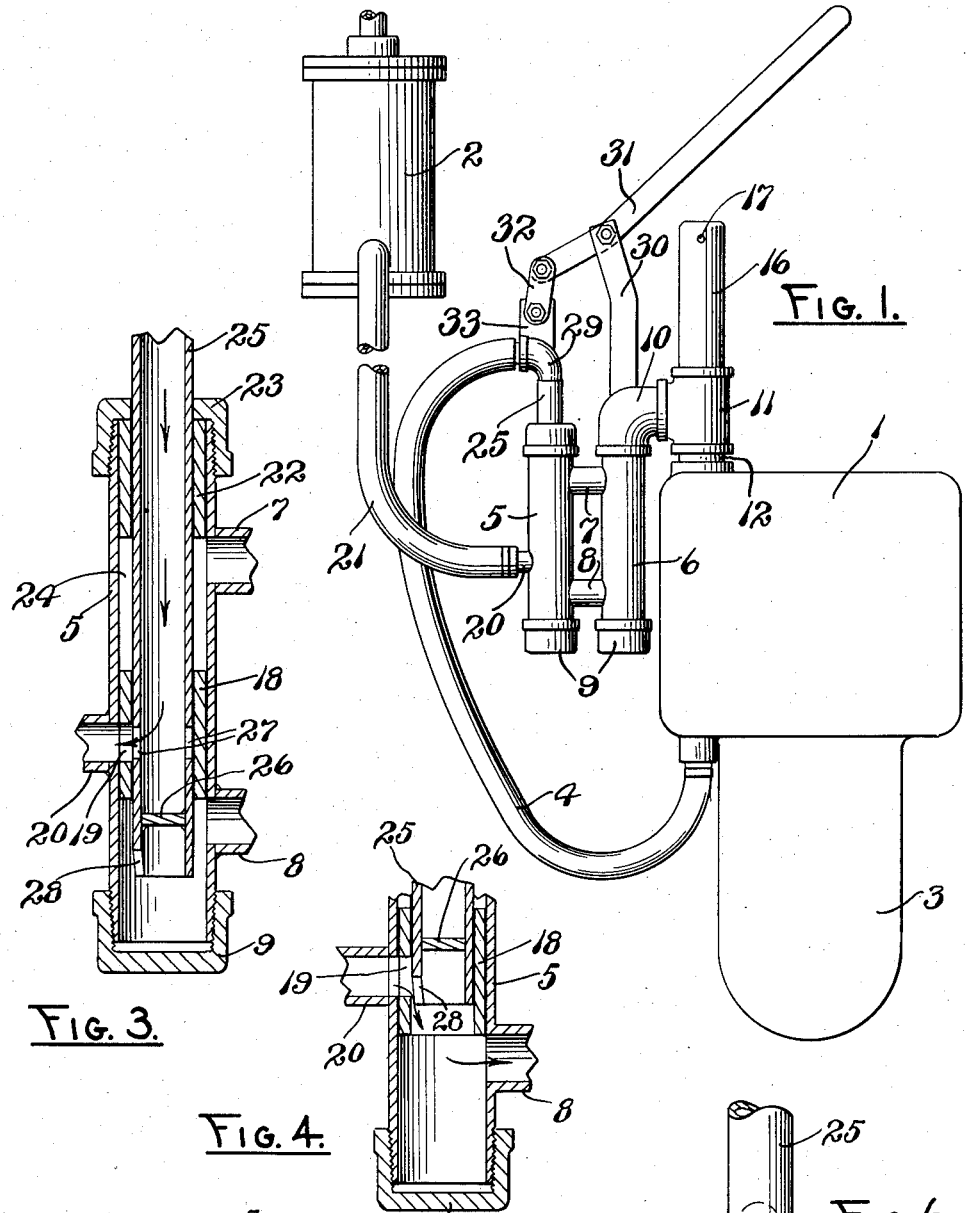
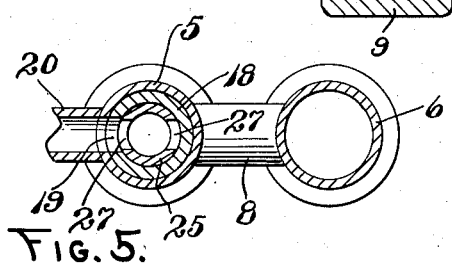
INVENTOR
ORLO M. GOOD
BY Liverance and Van Antwerp
ATTORNEYS Nov. 13, 1951     O. M. GOOD     2,574,556
HYDRAULIC VALVE Filed March 10, 1947     2 SHEETS—SHEET 2

INVENTOR
ORLO M. GOOD
BY Liverance and
Van Antwerp
ATTORNEYS

Patented Nov. 13, 1951

2,574,556

UNITED STATES PATENT OFFICE 2,574,556

HYDRAULIC VALVE

Orlo M. Good, Caledonia, Mich.

Application March 10, 1947, Serial No. 733,550

3 Claims. (Cl. 137—78)

The present invention is directed to the control of hydraulic flow, and more particularly, to a novel valve structure through which the control is exercised. In many uses of hydraulic power, the power has to be applied periodically or intermittently, but the pump which is pumping the liquid operates continuously. The liquid which is used and pumped under presure may, for example, be pumped against a piston in a hydraulic cylinder and a piston rod from the piston extended outwardly to perform the work desired. One place where the invention is particularly useful and has been practically used, is in connection with farm tractors having a liquid oil supply and a pump driven by the engine of the tractor, the liquid being pumped to a hydraulic apparatus connected with a manure loader, which loader at periodic intervals is operated to lift a load of the manure and dump it into a spreader. The engine of the tractor is continuously running and the pump connected therewith is likewise in continuous operation.

The pressures used are high, reaching, in the example stated, to 600 or 650 pounds per square inch. One major objective of the present invention is to provide a control for the hydraulic liquid which, without the use of packings, either of fabric or of metal, is continuously operable without leakage of oil or any danger of it. A further object of the invention is to provide a control valve structure of an exceptionally simple, practical, durable and economical form, the sturdiness and dependability of which has proven particularly satisfactory in use. A still further object is to provide such control for use with a continuously operative pump, for operation at selected intervals of time.

An understanding of the invention may be had from the following description, taken in connection with the accompanying drawings, in which, Fig. 1 is a side elevation showing the hydraulic valve control of my invention in an application thereof.

Fig. 3 is a fragmentary vertical section, similar to Fig. 2, illustrating one of the two positions of the valve in use, Fig. 2 showing the other position thereof.

Fig. 4 is a fragmentary vertical section of a portion of the structure shown in Fig. 2, but with the valve at a somewhat lower position for the control of the speed of return of a hydraulic piston to initial position after it has done its work.

Fig. 5 is a horizontal section through the control valve structure, and

Fig. 6 is a fragmentary side elevation of the lower end portion of the valve, relative to the fuel return inlet opening thereof, as shown in dotted lines, with the valve in relation to said return port substantially as in Fig. 4.

Like reference characters refer to like parts in the different figures of the drawings.

Figure 2:
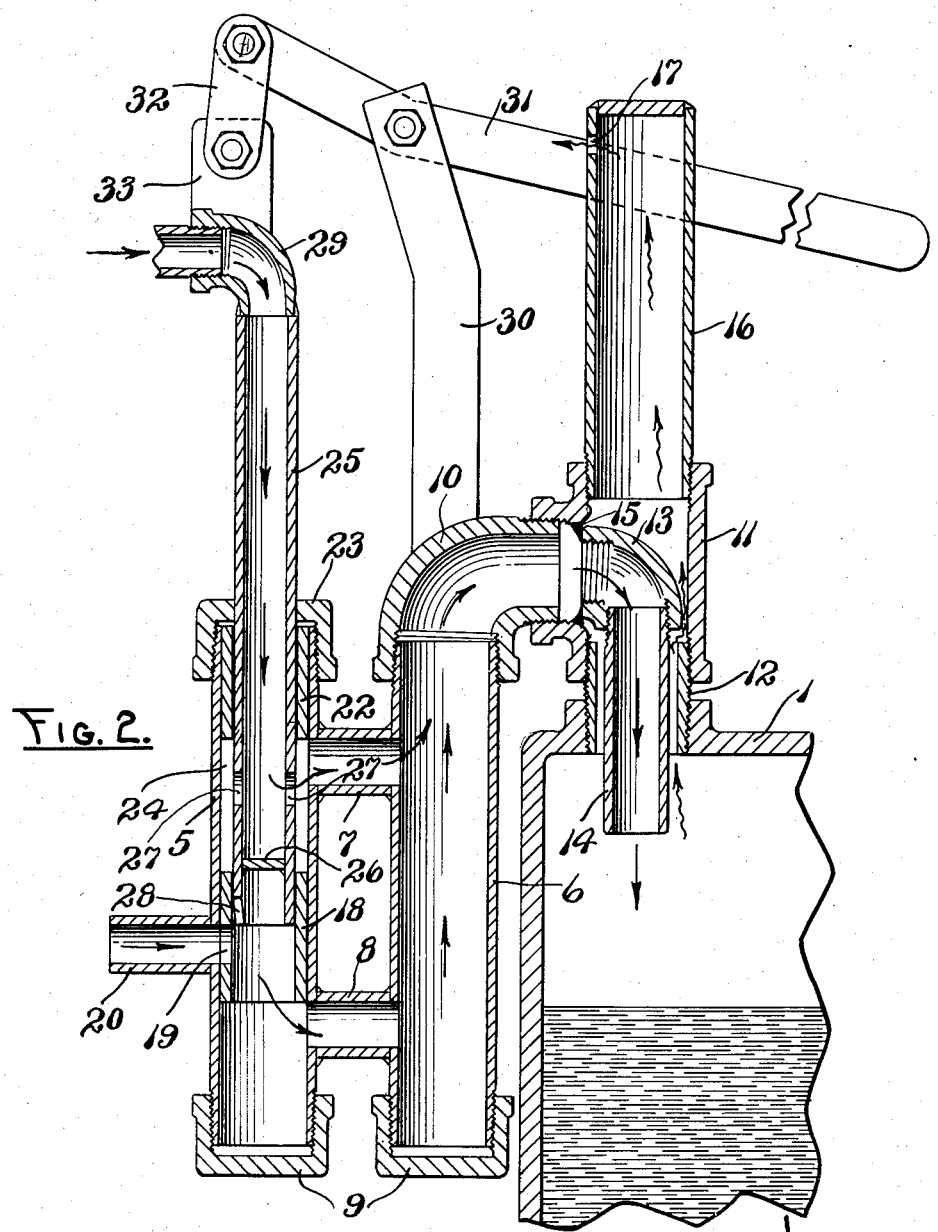
Fig. 2 is an enlarged vertical section through the valve control.

The oil or other liquid which is used in the hydraulic transmission of power is within a supply tank 1, from which, in the disclosure made, it is to be pumped under pressure to the lower end of a cylinder 2, having the usual piston therein to be moved by hydraulic pressure from the pumped oil. The oil is taken from the tank or reservoir 1 by a continuously driven pump housed within a housing 3 (Fig. 1) and forced outwardly through a flexible conduit 4 which leads to the hydraulic valve control which I have devised.

The structure illustrated of the hydraulic valve control includes two spaced vertical tubes 5 and 6, which are connected together by crosshorizontal upper and lower tubes 7 and 8. The two tubes 7 and 8 provide connecting passages between the interiors of the tubes 5 and 6. Each of the tubes 5 and 6 is closed at its lower end by closure cap 9 screwed thereon.

At the upper end of the tube 6, an elbow 10 is threadedly connected at one end. To the other end of the elbow a T-coupling 11 is connected by screw-threaded connection. The vertically positioned larger part of the coupling 11 is interiorly threaded at both ends and the lower end is connected by nipple 12 with the top of the oil tank 1. A smaller elbow 13 is located within the coupling 11, having one end located directly over the passage through the nipple 12, and to which a short length of tubing 14, the interior diameter of which is less than the interior diameter of the nipple 12, is connected by threading, as shown. The other end of the elbow 13 is welded, as indicated at 15, at the inlet side of the coupling 11, so that there is a free continuous passage from the tube 6, through the couplings 10 and 13, and pipe 14, to the interior of the tank 1.

In the upper end of the coupling 11, a short length of pipe 16 is threaded, the upper end of the pipe being closed. An opening 17 is made in one side of the pipe near its upper end. This provides an air inlet and exit to and from the oil supply tank 1.

Within the tube 5, between its ends, a sleeve 18 is fixedly secured. Such sleeve 18 at one side thereof has a port 19 through it, which is in direct alinement with a tubular member 20 soldered or otherwise permanently connected to the tube 5. A conduit 21 is secured to the part 20 at one end and extends to the lower end of the hydraulic piston 2 as shown in Fig. 5.

A second sleeve 22 is permanently secured in the upper end portion of the tube 5, its lower end reaching substantially to the horizontal connected passage between the tubes 5 and 6 provided by the upper cross-tube 7. The upper end of the tube 5 has a closure cap 23 screwed thereon. Between the lower end of the sleeve 22 and the upper end of the sleeve 18, is a continuous annular space 24 between the outer tube 5 and an inner valve tube 25, which passes through an opening in the cap 23, through the sleeve 22.

A short distance above the lower end of the valve tube 25 a transverse partition 26 is permanently connected by welding or brazing. Diametrically opposed openings 27 are made in the tube 25 a short distance above the transverse partition 26 and always located below the lower end of the sleeve 22. At the lower end of the valve tube 25, a triangular notch 28 is cut in a position such that when the valve tube 25 is moved downwardly, such notch may be brought into conjunction with the port 19, and upon further downward movement, pass entirely below the sleeve 18 in which the port 19 is located, as shown in Fig. 3.

The upper end of the valve tube 25 is connected by an elbow 29 with the flexible conduit 4, through which the oil is initially pumped from the supply of oil in the tank 1.

The valve tube 25 is to be manually moved lengthwise. A bar 30 in the disclosure made is shown fixed to the tube 6 extending upwardly therefrom, at the upper end of which a hand actuated lever 31 is pivotally mounted between the ends of the lever. One end of the lever extends over the elbow coupling 29 and is connected by a link 32 with an ear 33, permanently connected to said elbow as shown in Figs. 1 and 2.

With the valve at its lowermost position, as in Figs. 1 and 3, moved to such position by lifting upwardly on the free end of the hand lever 31, the openings 27 in horizontal alinement are located with one of said openings in direct conjunction with the port 19. The oil pumped and forced outwardly through the conduit 4, passes to and through the tubular valve member 25 until such opening 27 is reached, and passing through said opening in the port 19, is forced through the conduit 21 to the lower end of the cylinder 2. Removal of oil from the tank 1, tending to produce a vacuum therein, causes air to flow through the opening at 17, the pipe 16, and thence through the passages around the coupling 13 and pipe 14, to maintain the air pressure within the tank always equal to the outside atmospheric pressure. When the work to be done by the hydraulic cylinder 2 is accomplished, the tubular valve 25 may be lifted. If lifted to the position shown in Figs. 4 and 6, where the notched recess 28 has reached and partly extends over the port 19, the oil can return from the hydraulic cylinder (Fig. 4), and flowing through the cross-pipe 8, reach the cylinder 6 and thence is returned through the couplings 10 and 13 and the pipe 14. At the same time, the openings at 27 will be carried wholly or partly above the sleeve 18, so that the oil continuously pumped will pass through the upper horizontal pipe 7 to the vertical pipe 6, the oil being likewise returned. The speed of return flow of oil from the cylinder 2 may be governed by the position of the notch 28 with reference to the ports 18. In Fig. 2, with the valve in its uppermost position, the return flow of oil from the cylinder 2 is at its maximum, while as shown in Figs. 4 and 6, the flow of oil is checked and the return of the hydraulic piston and its connected rod is at a slower speed. With the valve as in Fig. 2, the pump may operate continuously and there is merely an oil circulation from the tank 1 back to it at an intermediate position of the valve between those shown in Figs. 1 and 2, with ports 27 above port 19 and partly above the upper end of sleeve 18 and with the notch 28 wholly below port 19 the oil pump will pass from the valve through tube 7 and thence back to the tank 1 the pump being relieved of the pressure of the load which has been elevated and of all other pressures except that required to circulate the oil.

With the return of oil to the tank, the air which it displaces is forced outwardly from the tank in the directions indicated by the arrows in Fig. 2, and thence outwardly through the opening at 17.

It will be apparent that with a valve as thus constructed, the pump operating continuously and forcing a flow of oil is relieved of all pressure when the load is held in a raised position. Likewise, all pressure is released from the pump while the piston is returning to its lowermost position. At no time, with the valve disclosed, is there any high pressure on any part of the pump or valve except when the load is being lifted. This permits a structure in which no oil pressure resisting stuffing box is needed to prevent escape of oil. By using the flexible conduit 4, oil under high pressure is carried from the pump only to the valve 25. Therefore the valve operates, by reason of the structure described, without leakage and without the use of high pressure packing being required, as the only pressure from the oil in the flexible conduit 4 is transmitted directly to the valve tube 25 within which all pressure is received during the lifting of the piston in the cylinder 2.

When the valve tube 25 is at its down position, as in Fig. 2, all the oil continuously pumped by the pump flows through the annular space 24 between the sleeves 22 and 18, and it is impossible to have any pressure at the upper sleeve 22 greater than that of the oil flowing through such space. Irrespective of the degree of wear which might occur between the sleeve 18 and the tube 25, leakage of oil can not build up pressure within such annular space between the sleeves, indicated at 24, as the oil has a free flow back to the tank.

The only outlet for the oil under high pressure within the valve tube 25 is the single outlet at 27, when such oil is to be conducted through the conduit 21 to the cylinder 2 to perform the work desired.

The structure described is of a particularly practical, simple and durable form. No packings for the purpose of preventing oil leakage are required. In practice, a relatively thin felt washer may be used at the upper ends of the tube 5 and the sleeve 22 within the cap 23, merely to prevent some possible seepage of oil along the outer surface of the tube 25 above such cap, but the felt or fabric washer is subjected to none of the heavy pressure which in practice may exceed 600 pounds to the square inch. There is no emulsifying action involving a foaming intermixture of oil and air, which foaming is to be avoided completely, if possible, and is avoided with the present structure. The presence of air in the oil pumped is very undesirable in all hydraulic apparatus. It is to be understood that the hydraulic cylinder 2 shown is merely diagrammatically illustrative of many and various types of hydraulic apparatus operable by the pumping of oil or other liquid under pressure to it; and the invention is in no sense limited with respect to the specific hydraulic cylinder apparatus shown.

The invention is defined in the appended claims and is to be considered comprehensive of all forms of structure coming within their scope.

I claim:

1. In a structure as described, an elongated chamber closed at one end, having two spaced exhaust ports in a wall of said chamber between the ends thereof, spaced guiding sleeves fixed within said chamber, one located between said exhaust ports and the other at the open end of the chamber and located outwardly of the nearest adjacent exhaust port, the first mentioned of said sleeves having a port at a side thereof, said port adapted to have a liquid conduit connected therewith, a tubular valve slidably mounted within, extending through and having liquid sealing relation to said sleeves, having a lateral port through a side thereof adapted in one position to be brought into conjunction with the port through said sleeve and in another position to be located between adjacent ends of the sleeves, reaching said latter position before the inner end of said tubular valve is moved to uncover the port in the sleeve, a transverse closure between the port therein and the inner end of the valve, said valve adapted to have a flexible supply conduit connected to the outer end thereof, and means for manually moving the valve in the direction of its length, the inner end of the valve when the valve is moved to an outer position being located outwardly of the port in said sleeve.

2. A structure as defined in claim 1, said transverse closure in said valve being located between the inner end of the valve and said port therein and said valve at its inner end portion, beyond said transverse closure, having a recess in a side thereof of greatest width at the end of the valve and decreasing in width away therefrom, said recess being located to be movable into whole or partial conjunction with the port in said sleeve, or to other positions at both sides of said port.

3. A hydraulic valve comprising, a wall cylindrical chamber closed at its inner end and having spaced outer and inner exhaust ports through the wall thereof, and a supply port between the exhaust ports, a tubular valve extending into said chamber at its outer end and slidably mounted for movement lengthwise thereof, said chamber at its outer end beyond said supply and exhaust ports and between its ends, opposite said supply port, having a reduced diameter substantially equal to the exterior diameter of the valve, said valve adapted to have a flexible conduit communicating with the outer end thereof for connection with a source of fluid supply, said valve having a port through the wall thereof between its ends, means closing the tubular valve adjacent its inner end and inwardly of the port therein, and means for moving said tubular valve in said chamber to a plurality of positions wherein, in one position the port therein communicates with the outer exhaust port and the supply port, and the inner exhaust port is uncovered, in another position the port therein is in communication with the outer exhaust port and the supply port is covered and in a third position, the port therein is in communication with said supply port and the outer and inner exhaust ports are closed against communication.

ORLO M. GOOD.

REFERENCES CITED

The following references are of record in the file of this patent:

UNITED STATES PATENTS

| Number | Name | Date |
|---|---|---|
| 193,134 | Andrews | July 17, 1877 |
| 1,165,653 | Dunn | Dec. 28, 1915 |
| 2,293,906 | Kvavle | Aug. 25, 1942 |
| 2,320,905 | Bateholts | June 1, 1943 |

FOREIGN PATENTS

| Number | Country | Date |
|---|---|---|
| 3,590 | Great Britain | of 1890 |